Nov. 19, 1929.  P. A. FITZHUGH  1,735,920
COTTON SEED HANDLER
Filed Jan. 24, 1928   3 Sheets-Sheet 1
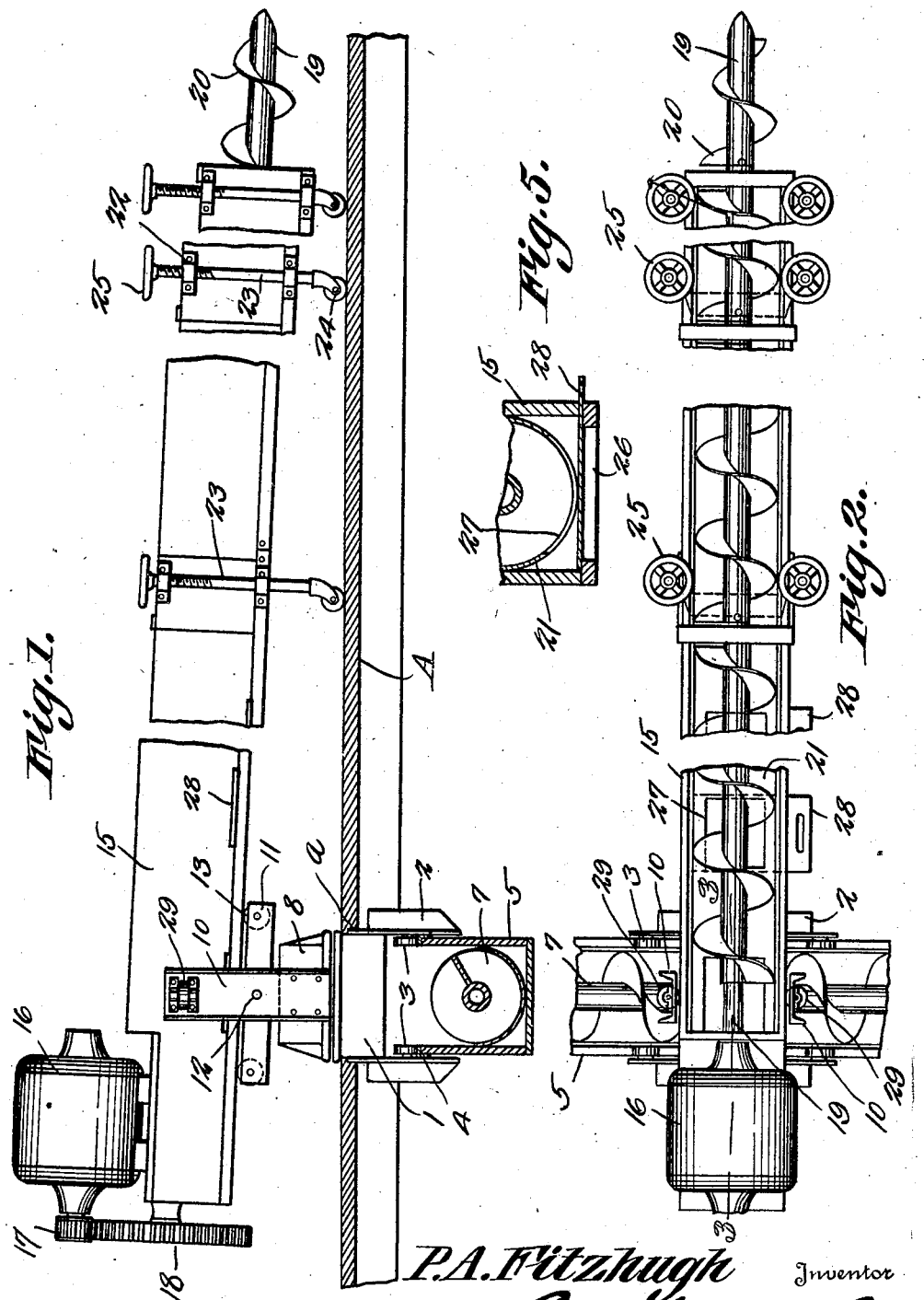
P. A. Fitzhugh  Inventor
By C. A. Snow & Co.
Attorneys.

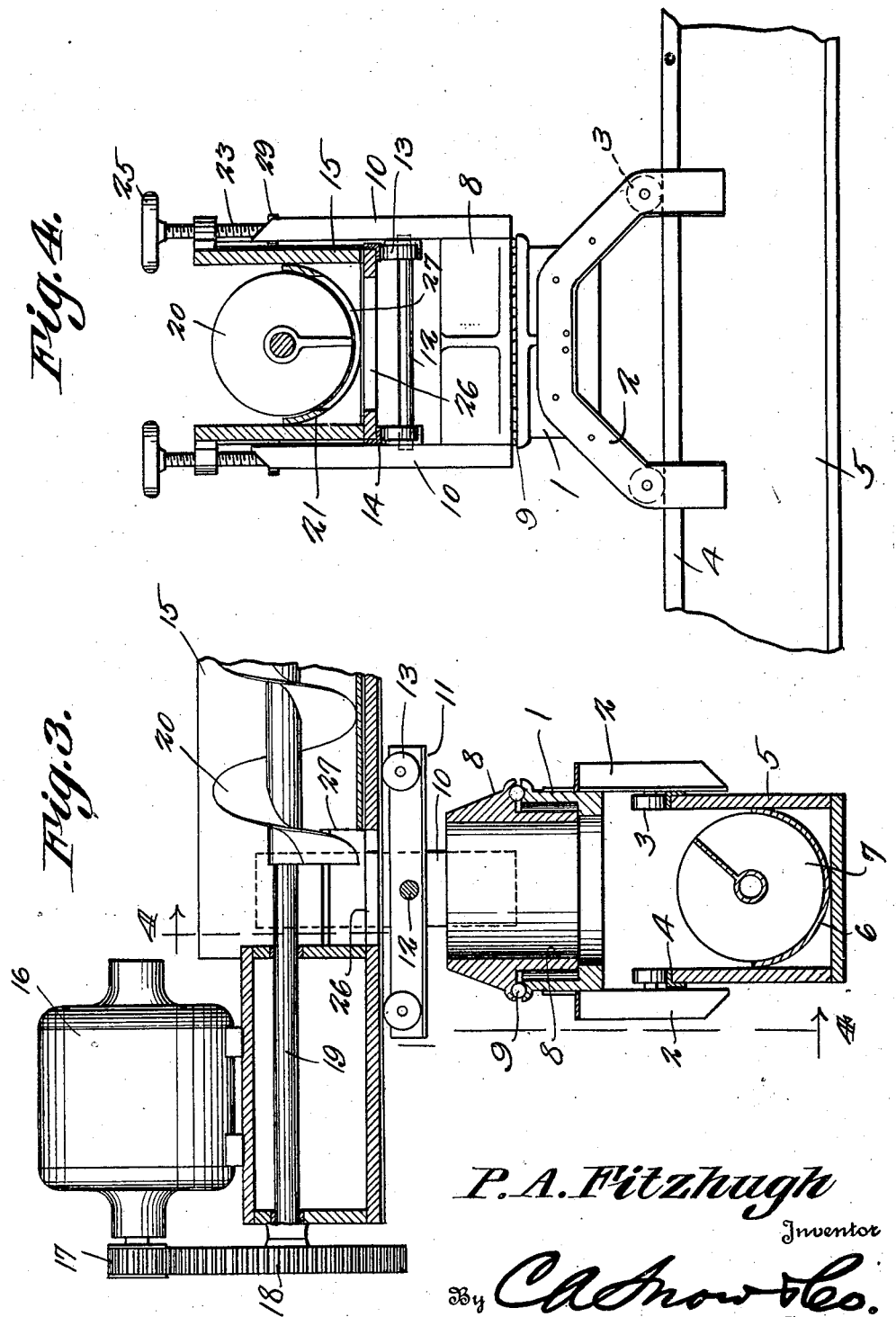

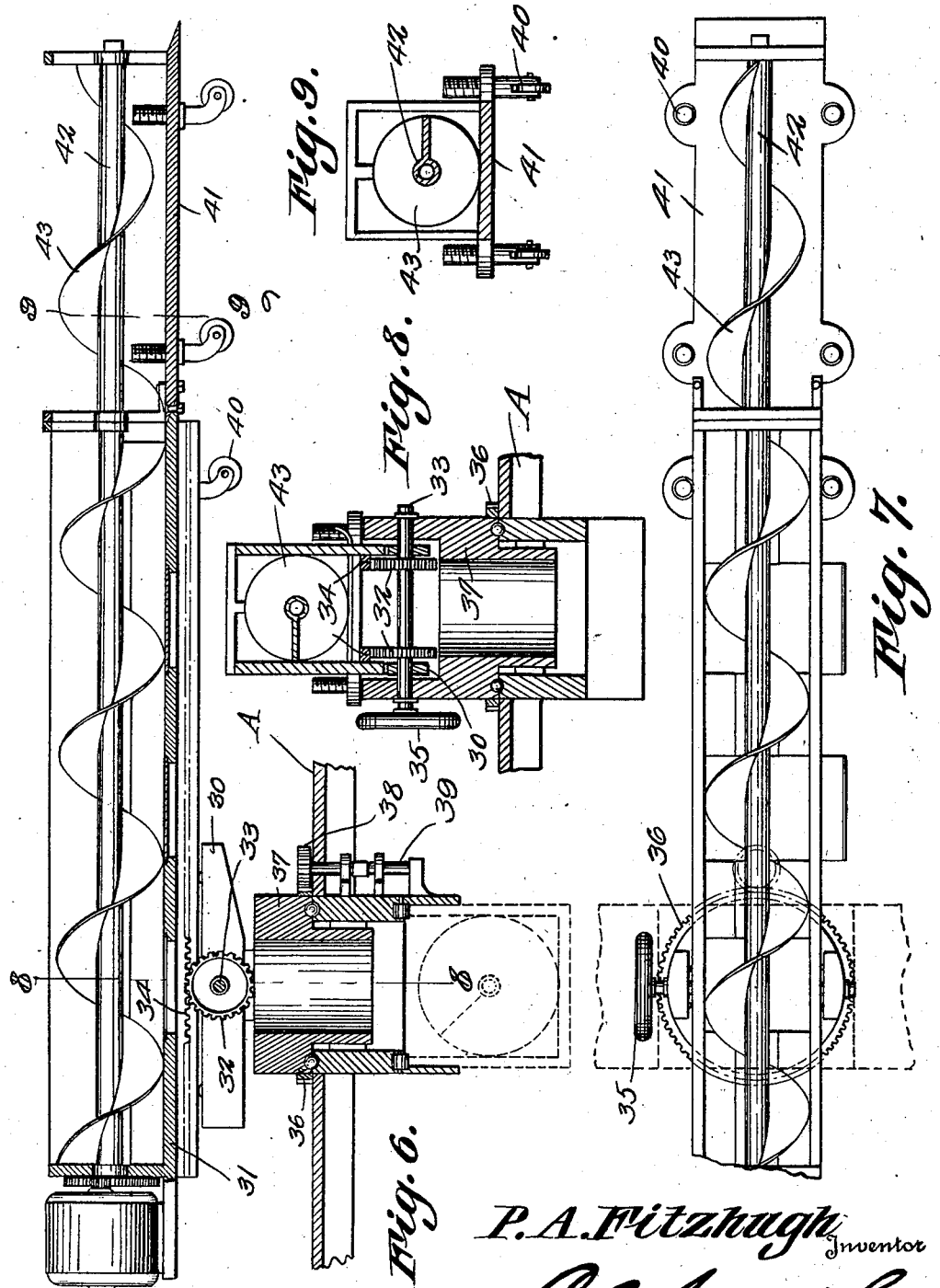

Patented Nov. 19, 1929

1,735,920

UNITED STATES PATENT OFFICE

PHILIP AYLETT FITZHUGH, OF SUMNER, MISSISSIPPI, ASSIGNOR TO FITZHUGH'S SEED HANDLER AND STORAGE COMPANY, INC., A CORPORATION OF MISSISSIPPI

COTTONSEED HANDLER

Application filed January 24, 1928. Serial No. 249,162.

This invention relates to a machine for handling seed and is designed primarily for handling cotton seed from the cars, wagons, trucks, etc., into seed storage houses, tanks, or other receptacles and also after it has been stored in a seed house, or other receptacles to points around a manufacturing plant and to handling or conveying said seed as may be desired during process of manufacturing.

It is an object of the invention to provide a novel portable form of conveyor that may be located in the store room or such other points as may be desired and it includes means whereby the seed can be directed to an outlet delivering to a chute or the like located therebelow or above and which chute or conveyor can be employed for conducting the seed from or to a car or other structure or places within or adjacent a building.

A further object is to provide a seed handling mechanism the conveyor portion of which can be adjusted both longitudinally, vertically, and annularly thereby to bring seed mechanism into position where it can remove seed from any one of a number of piles located in the seed house, cars, wagons, or trucks at different points relative to the outlet.

A further object is to provide a structure of this character which can be operated readily and will act to quickly remove the seed and convey the same to the outlet.

Another object is to provide mechanism of this type which can be employed in connection with a permanently installed outlet or delivery chute such as constitutes a part of the regular equipment of a seed house, tanks or receptacles.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings the preferred form of the invention has been shown.

In said drawings,

Figure 1 is a side elevation of the apparatus constituting the present invention, the floor on which it is mounted and the delivery chute thereunder being shown in section, parts of the conveyor being broken away.

Figure 2 is a top plan view of the structure shown in Figure 1.

Figure 3 is an enlarged vertical longitudinal section on line 3—3, Figure 2, the motor and the parts driven thereby being shown in elevation.

Figure 4 is a section on line 4—4, Figure 3.

Figure 5 is a transverse section through a portion of the conveying mechanism showing the feeding end of the conveyor.

Figure 6 is a view similar to Figure 1 showing a modified structure.

Figure 7 is a plan view of a modified structure.

Figure 8 is a section on line 8—8, Figure 6.

Figure 9 is a section on line 9—9, Figure 6.

Referring to the figures by characters of reference A designates a portion of the floor of the storage room of a seed house and this floor is provided, preferably at a central point, with an opening $a$. Seated within the opening $a$ is a tubular supporting member 1 provided at diametrically opposed points with hangers 2 each of which is preferably in the form of a yoke. Each arm of each yoke can be provided with a small wheel 3 and all of the wheels are adapted to bear upon rails 4 secured on the upper edges of the side walls of a delivery chute 5. This chute is usually a part of the regular equipment of a seed house and can be fixedly or movably mounted and can be utilized to support the hangers 2 and the member 1 or, under some conditions, the wheels or rollers 3 can constitute thrust bearings for the chute 5 if the same is mounted for up and down movement. The chute 5 may be formed with an interior longitudinally extended trough 6 within which may be positioned a delivery screw 7 which, when rotated by any suitable means, will act to feed material longitudinally of the trough.

Mounted for rotation within the tubular member 1 is a tubular pedestal 8 and, as shown particularly in Figure 3, this pedestal may be provided with anti-friction bearings 9 so that the pedestal can be rotated readily relative to the member 1.

Extended upwardly from the pedestal 8 at diametrically opposed points are standards 10 and these standards support a tiltable table 11 formed preferably of angle strips as shown and pivotally mounted at its center as shown at 12. Supporting wheels 13 are carried by the end portions of the table and are engaged by wear strips 14 extended longitudinally along the bottom of an elongated trough 15 movably supported between the standards 10. This trough has an electric motor 16 mounted on one end portion thereof and adapted to transmit motion through gears 17 and 18 to a shaft 19 supported within and extending longitudinally of the trough 15. This shaft carries a conveying screw 20 and one end of the shaft projects beyond that end of the trough remote from the motor as shown particularly in Figure 1.

Trough 15 has a transversely concaved bottom plate 21 extending close to the screw 20 and designed to receive the wear caused by the movement of seed within the trough.

Extending from the sides of the trough 15 at its receiving end and at intermediate points are brackets 22 arranged in pairs, each pair including an upper bracket and a lower bracket. Mounted in the brackets of each pair is a screw thread stem 23 provided at its lower end with a small wheel or caster 24 while its upper end has a hand wheel 25 or the like by means of which the stem can be rotated and thus adjusted upwardly and downwardly relative to the brackets. Obviously, therefore, by properly adjusting the stems 23 the trough 15 can be supported at any desired angle relative to the floor A.

Spaced outlet openings 26 are formed in the bottom of the trough, and match corresponding openings 27 within the plate 21 so that material flowing downwardly through each opening 21 will also be free to flow through the opening 26 thereunder. Each opening 26, except the one nearest the motor 16 has a sliding valve 28 in the form of a plate. By shifting this valve the flow of seed downwardly through the openings can be controlled.

For the purpose of facilitating longitudinal movement of the trough 15 between the standards 10, side thrust rollers 29 can be mounted in the upper portions of the standards for engagement with the sides of the trough.

It is to be understood that the mechanism herein described can be portable or can be set up in or adjacent to a seed house so as to deliver to the compartment in which the seed are required during the process of storing or manufacturing. The seed are deposited in piles and by swinging the trough 15 about the axis of rotation of the pedestal 8 it can be brought in line with any one of the piles of seed. Thereafter the trough is forced longitudinally so as to cause the projecting end of the screw 20 and shaft 19 to burrow into the pile of seed. The rotating screw will force the seed back into the trough 15 until it reaches one of the openings 27 and 26 located directly over the tubular pedestal. As the valve 28 is open at this point the seed will drop through the openings and the pedestal into the trough thereunder where the screw 7 will act to deliver the seed from the outlet of the trough. Trough 15 can be shifted back and forth and swung annularly so that all of the seed within the house or cars can thus be reached and brought back to the outlet opening above the pedestal.

While the movement of the trough can be effected by an operator located adjacent thereto, a suitable arrangement for manipulating the parts can be employed if desired. In this connection attention is directed to the structure illustrated in Figures 6 to 9 inclusive. In said structure the frame 30 which supports the shiftable trough 31 carries gears 32 mounted on a shaft 33 which constitutes the pivot of the frame. These gears mesh with racks 34 carried by the bottom of the trough 31. A hand wheel 35 or the like is carried by the shaft, and, when rotated, will cause the racks 34 to move longitudinally, thereby correspondingly shifting the trough. For the purpose of rotating the trough a ring gear 36 may be secured to the pedestal 37 so as to extend therearound. A gear 38 meshes with the ring gear and is connected to a shaft 39 extending through the floor A. By applying a wrench or other tool to this shaft and rotating it the pedestal 37 and the parts carried thereby can also be rotated.

In Figure 6 the trough 31 has been shown elevated out of normal position. It has casters 40 for supporting it on the floor and these casters can be adjustably connected to the bottom of the trough as shown. Furthermore, if desired, a blade 41 can be extended forwardly from the open end of the trough and under the projecting portion of the shaft 42 and the screw 43. It will be noted that by providing a structure such as illustrated in Figures 6 to 9 the annular adjustment of the trough can be effected from below the floor A. Furthermore the blade 41 will act as a scoop or scraper to assist the screw 43 in directing the seed into the trough.

What is claimed is:

1. Seed handling apparatus including a tubular pedestal mounted for rotation, a conveying trough movable therewith, all portions of said trough being shiftable longitudinally relative to and across the pedestal, and conveying means in and shiftable with the trough.

2. Seed handling apparatus including a tubular pedestal mounted for rotation, a trough slidable across and tiltably connected to the pedestal and rotatable therewith, and conveying means carried by the trough.

3. Seed handling apparatus including a tubular pedestal mounted for rotation, a tiltable frame connected thereto, a trough having a receiving end and an outlet portion, said outlet portion being supported by the frame and rotatable with the pedestal, said trough being slidable bodily on the frame and across the pedestal, an adjustable support for the receiving end of the trough, and a conveyor within the trough.

4. Seed handling apparatus including a pedestal mounted for rotation and having a passage therethrough, a trough having a receiving end and an outlet portion, said trough being tiltably and slidably connected to the pedestal and mounted for longitudinal movement relative to and across the pedestal while delivering material thereto, adjustable means for supporting the trough at its receiving end for arcuate and longitudinal movement, a conveyor within and projecting from the trough, and a motor geared to the conveyor.

5. Seed handling apparatus including a pedestal mounted for rotation having a downwardly extending outlet passage, a trough slidable across and tiltably connected to and rotatable with the pedestal, said trough having an inlet end, there being a plurality of valved outlets in the bottom of the trough, said trough being shiftable longitudinally to bring any one of the outlets into communication with the outlet passage in the pedestal and to direct the inlet end of the trough toward bulk material to be handled, and a conveyor within the trough.

6. Seed handling apparatus including a pedestal mounted for rotation having a downwardly extending outlet passage, a trough slidable across and tiltably connected to and rotatable with the pedestal, said trough having an inlet end, there being a plurality of valved outlets in the bottom of the trough, said trough being shiftable longitudinally to bring any one of the outlets into communication with the outlet passage in the pedestal and to direct the inlet end of the trough toward bulk material to be handled, a conveyor within the trough and projecting at one end therebeyond, a motor at the other end of the trough for actuating the conveyor, and a wheel adjustably connected to the trough at its inlet end for supporting said end for arcuate and longitudinal movement.

7. Seed handling apparatus including a pedestal mounted for rotation having a downward outlet passage, trough engaging means at the bottom of the pedestal, a trough slidably mounted on the pedestal and movable therewith, a conveying screw journalled in the trough and projecting at one end therebeyond, means for adjustably supporting said end of the trough, and a motor adjacent the other end of the trough for driving the screw.

8. Seed handling apparatus including a pedestal mounted for rotation having a downwardly extended outlet passage, a trough tiltably and slidably connected to the pedestal and rotatable therewith, supporting wheels for the trough adjustably connected thereto, a motor mounted adjacent to one end of the trough, a screw conveyor within the trough driven by the motor, said conveyor projecting from the trough, means for shifting the trough longitudinally relative to the pedestal, and means whereby the pedestal may be rotated.

9. Seed handling apparatus including a trough slidably mounted, a support therefor having an outlet passage, means whereby the support may be rotated to move the end of the trough in an arc horizontally, a conveying screw within the trough and projecting from one end, a motor above the trough for actuating the screw, a scraping blade projecting from the trough under a portion of the screw, and means for sliding the trough longitudinally relative to its support to force said blade and the projecting portion of the screw into bulk material to be conveyed to the outlet passage.

In testimony that I claim the foregoing as my own, I have hereto affixed my signature.

PHILIP AYLETT FITZHUGH.